3,405,111
HALOGENATION OF ORGANIC COMPOUNDS IN HALOGENATED ACETONITRILE SOLVENTS
George W. Brady, Jr., Barboursville, and Joseph P. Henry, South Charleston, W. Va., assignors to Union Carbide Corporation, a corporation of New York
No Drawing. Filed Mar. 23, 1965, Ser. No. 442,173
7 Claims. (Cl. 260—92.8)

ABSTRACT OF THE DISCLOSURE

The chlorination of organic compounds can be efficaciously carried out in the presence of halogenated acetonitriles. Whether the mechanism of the chlorination reaction proceeds by addition or substitution, it has been discovered that the chlorination reaction can be satisfactorily carried out by dissolving the organic compounds in a halogenated acetonitrile, preferably a solvent such as trichloroacetonitrile, and passing chlorine through the solution.

---

This invention relates to a halogenation solvent for halogenation reactions. It is particularly directed to the use of a halogenation solvent in halogenation reactions wherein the reactants and the resulting halogenated products are both soluble in the solvent. In another aspect, the present invention is concerned with the use of a halogenation solvent wherein the catalyst employed for the reaction is soluble in the halogenation solvent.

It is well known that the reaction of halogens with organic compounds generally proceed by either substitution reaction or by addition reaction. The substitution halogenation reaction involves the removal of a hydrogen atom from the organic molecule and its substitution by a halogen atom. This reaction is ordinarily a free radical type reaction and is promoted by light, heat and free radical generating agents. The halogen is generally non-selective insofar as the particular hydrogen atom which it will substitute. Accordingly, this non-selectivity in the substitution of hydrogen atoms from organic molecules limits the types of solvent which can be satisfactorily employed for these types of reactions.

The most common solvents which have heretofore been employed for the halogenation reactions of organic compounds are perhalogenated solvents such as, carbon tetrachloride, tetrachloroethylene, or halogenated solvents in which the hydrogen atoms are not readily susceptible to substitution such as for example, pentachloroethane. While these solvents have been satisfactory for some reactions, they have proven to be unsatisfactory for some other halogenation reactions. The foregoing solvents are generally characterized by having a low dielectric constant and they are extremely poor solvents for relatively polar compounds.

Another type of halogenation reaction which is well known in the art proceed by the addition of halogen to the organic molecule. These addition reactions are usually catalyzed by halogen carriers such as for example, ferric chloride ($FeCl_3$). However, these catalysts, as well as other catalysts which are employed for the addition type halogenation reaction, are generally insoluble in the solvents which have heretofore been employed.

It has been discovered that the disadvantages which are inherent in the use of the foregoing solvents and other commonly employed solvents in the halogenation reactions of organic compounds, can be obviated by the use of trichloroacetonitrile as a solvent for the halogenation reactions. Trichloroacetonitrile ($CCl_3CN$) has a relatively high dielectric constant ($E=7.85$ as compared to $E=2.2$ for carbon tetrachloride) and is an extremely effective solvent for polar compounds such as halogen carriers and some of the chlorinated derivatives of organic molecules. For example, chlorinated polybutadiene has been found to be insoluble in carbon tetrachloride whereas it has been found to be readily soluble in trichloroacetonitrile. Furthermore, whereas ferric chloride, as well as other catalysts employed for the halogenation reaction, have been found to be insoluble in carbon tetrachloride and other commonly employed solvents, these catalysts have been found to be readily soluble in trichloroacetonitrile. It is also noteworthy that trichloroacetonitrile has a low freezing point, −41° C., thus permitting halogenation reactions to be effected at relatively low temperatures. This is particularly advantageous for the addition type halogenation wherein the reaction is more favorably effected at low temperatures.

Trichloroacetonitrile is essentially insoluble in water and can therefore be readily recovered by water washing of the reaction mixture or by distillation. This water insolubility is, of course, of great practical advantage since essentially all of the solvent can be recovered and reused.

Trichloroacetonitrile is a lachrymatory liquid which is somewhat toxic and this lachrymatory property permits the detection of the presence of even trace quantities of trichloroacetonitrile in the atmosphere. The density of trichloroacetonitrile is $d^{20}=1.4523$, its refractive index ($N^{20/D}$) is 1.4408, its vapor pressure P is 58.5 mm. at 20° C. and its boiling point is 85.5° C. at 760 mm. of mercury (52° C. at 200 mm. and 37° C. at 100 mm. of mercury).

As previously indicated, trichloroacetonitrile is an extremely efficient solvent for both addition type, as well as substitution type halogenation reactions. The following examples will illustrate the use of trichloroacetonitrile in the halogenation reactions described herein.

Example 1

A solution of 10 grams poly(vinyl chloride) and 490 grams of trichloroacetonitrile was added to a one-liter, four-neck, round-bottom flask which was equipped with a stirrer, thermometer, gas inlet tube and a water cooled condenser. The condenser was vented to a Dry Ice and acetone cooled trap. The mixture was heated to 75° C. by an ultra-violet lamp while stirring and purging the flask with a stream of dry nitrogen.

Eight grams of chlorine was vaporized into the flask over a period of 95 minutes. The resulting mixture was poured into 3.4 liters of methanol, stirring the resulting mixture and allowing the precipitation of the chlorinated resin. The methanol-trichloroacetonitrile mixture was separated from the resin by decantation. The chlorinated resin was then washed with a one-liter portion of fresh methanol, filtered and dried on a Buchner funnel. The chlorinated poly(vinyl chloride) on the Buchner funnel was further washed with methanol and dried. The resulting chlorinated poly(vinyl chloride) upon analysis contained 69.6% by weight chlorine as compared to 56.8% chlorine in the poly(vinyl chloride) reactant. The methanol-trichloroacetonitrile filtrate was washed with water and approximately 92% of the trichloroacetonitrile was recovered in this manner. The recovered trichloroacetonitrile was then dried over calcium sulfate and distilled for further use.

Example 2

A solution of 3 grams of poly(1,4-butadiene) in 500 grams of trichloroacetonitrile was charged to a one-liter, four-neck, amber-glass, round-bottom flask equipped with a stirrer, thermometer, gas inlet tube, and a reflux condenser. The condenser was vented to a Dry Ice and acetone cooled trap. .05 gram of ferric chloride catalyst was also dissolved in the mixture. The reaction flask was purged with a stream of dry nitrogen while stirring the reaction mixture and cooling the same to 0° C. 8.5 grams of chlorine was vaporized into the reaction mixture. The reaction was effected under continued stirring at a temperature of 0 to 2° C. Stirring was continued for 2½ hours after completing the addition of chlorine. The mixture was then poured in one-liter of methanol and stirred vigorously for 15 minutes. The resulting chlorinated resin was separated from the mixture of methanol-trichloroacetonitrile by decantation, was washed with two 500 milliliter portions of fresh methanol and dried. Analysis of the chlorinated poly(1,4-butadiene) indicated that the resin contained 56.28 weight percent chlorine compared to a theoretical chlorine content of 56.80 weight percent. Trichloroacetonitrile was then recovered from admixture with methanol by distillation of an azeotrope of trichloroacetonitrile and methanol (boiling point 61° C.) and washing the azeotrope with cold water. The trichloroacetonitrile layer was then dried to recover the solvent for further use.

Example 3

40 grams of bromine and one-tenth of a gram of ferric chloride catalyst dissolved in 200 grams of trichloroacetonitrile was charged to a 500 milliliter, four-neck, amber-glass, round-bottom flask equipped with a stirrer, thermometer, gas inlet tube and a reflux condenser. The reflux condenser was vented to a cold trap consisting of a mixture of Dry Ice and acetone. 16 grams of vinyl fluoride was bubbled into the reaction mixture over a two-hour period and the reaction temperature was maintained between 10° C. to 25° C. The reaction mixture was distilled through a Vigreux column. Approximately 97% of the trichloroacetonitrile solvent (boiling point 85° C. at 760 milliliters of mercury) was recovered. The pressure was then reduced to 100 milliliters of mercury and distillation was continued. 39 grams of 1,2-dibromo-1-fluoroethane was isolated having a boiling point of 60° C. at 100 milliliters of mercury.

As it is evident from the foregoing examples, trichloroacetonitrile can be efficaciously employed as a solvent for either addition type halogenation reactions or substitution type halogenation reactions. The quantity of the solvent which can be employed, the reaction temperature which must be maintained, the chlorination period, as well as other optimum reaction conditions are not narrowly critical in this invention as they fall within the purview of the knowledge of a person skilled in the art. The essence of the present invention is the use of trichloroacetonitrile as a solvent for halogenation reactions involving the halogenation of organic compounds. Thus, trichloroacetonitrile provides a liquid vehicle in which both the reactants, the resulting chlorinated products and the commonly employed catalyst remain soluble throughout the reaction. Furthermore, the solvent is readily recoverable and can be reused if desired.

The use of trichloroacetonitrile as a solvent is not limited to the specific reactants which have been described in connection with the foregoing examples. Rather its use can be extended to encompass the halogenation of olefins and polyolefins in general and for the substitution halogenation of other organic compounds as well.

The present invention is readily amenable to continuous operation and the solvent may be recovered and recycled for further use.

While the invention has heretofore been described in connection wtih the use of trichloroacetonitrile as the solvent, it should be mentioned that other halogenated acetonitriles can also be employed as solvents for halogenation reactions. For example, dichlorofluoroacetonitrile has also been discovered to be an effective solvent for these reactions. The following examples illustrate the use of dichlorofluoroacetonitrile, a solvent for chlorination of 1,2-dichloroethylene.

Example 4

A 50 percent solution of 1,2-dichloroethylene (572 grams or 5.90 moles) in dichlorofluoroacetonitrile was charged to a two-liter glass flask equipped with a stirrer, a thermometer, gas inlet tube and Dry Ice-cooled reflux condenser. The condenser was vented into a water-filled gas scrubber and a Dry Ice-acetone cooled trap. Chlorine was bubbled into the reaction mixture at a controlled rate until a total of 422 grams of chlorine (5.92 moles) was added. The reaction mixture was heated by an ultraviolet lamp spaced approximately 6 inches away from the reaction flask to initiate the reaction. The reaction was exothermic and the reaction temperature was maintained between 40–50° C. by refluxing dichlorofluoroacetonitrile.

The product of the reaction was acetylene tetrachloride with a boiling point of 146° C., at 760 mm. of mercury. The yield of acetylene tetrachloride was 95.2 percent (943 grams) and approximately 98.5 percent of the solvent (dichlorofluoroacetonitrile) was recovered.

What is claimed is:

1. In a process for the halogenation of organic compounds which comprises reacting an organic compound with a halogen, the improvement which comprises using as the organic compound one soluble in halogenated acetonitrile and effecting said halogenation reaction in a solvent selected from the group consisting of halogenated acetonitrile.

2. The process of claim 1 wherein said halogenated acetonitrile is trichloroacetonitrile.

3. The process of claim 1 wherein said halogenated acetonitrile is dichlorofluoroacetonitrile.

4. The process for the chlorination of poly(vinyl chloride) which comprises reacting poly(vinyl chloride) with chlorine in the presence of trichloroacetonitrile thereby producing chlorinated poly(vinyl chloride), separating the resulting chlorinated poly(vinyl chloride) from trichloroacetonitrile, and recovering said trichloroacetonitrile.

5. The process for the chlorination of poly(1,4-butadiene) which comprises reacting said poly(1-4-butadiene) with chlorine in the presence of trichloroacetonitrile thereby producing chlorinated poly(1,4-butadiene), separating said chlorinated poly(1,4-butadiene) from the reaction mixture and recovering said trichloroacetonitrile.

6. A process for the bromination of vinyl fluoride which comprises reacting said vinyl fluoride with bromine in the presence of trichloroacetonitrile thereby producing 1,2-dibromo-1-fluoroethane, separating said 1,2-dibromo-1-fluoroethane from the reaction mixture and recovering said trichloroacetonitrile.

7. A process for the chlorination of 1,2-dichloroethylene which comprises reacting said 1,2-dichloroethylene with chlorine in the presence of trichlorofluoroacetonitrile thereby producing acetylene tetrachloride, separating said acetylene tetrachloride from the reaction mixture and recovering said dichlorofluoroacetonitrile.

References Cited

Bailey, Jr., F. E., et al.: "The Preparation of Head-To-Head Poly(Vinyl Chloride)." In Journal of Polymer Science. Vol. 2, part B, 1964, pp. 447–451, QD281P6J62. Apr. 13, 1964.

JOSEPH L. SCHOFER, *Primary Examiner.*

J. A. DONAHUE, *Assistant Examiner.*